Figure 1:
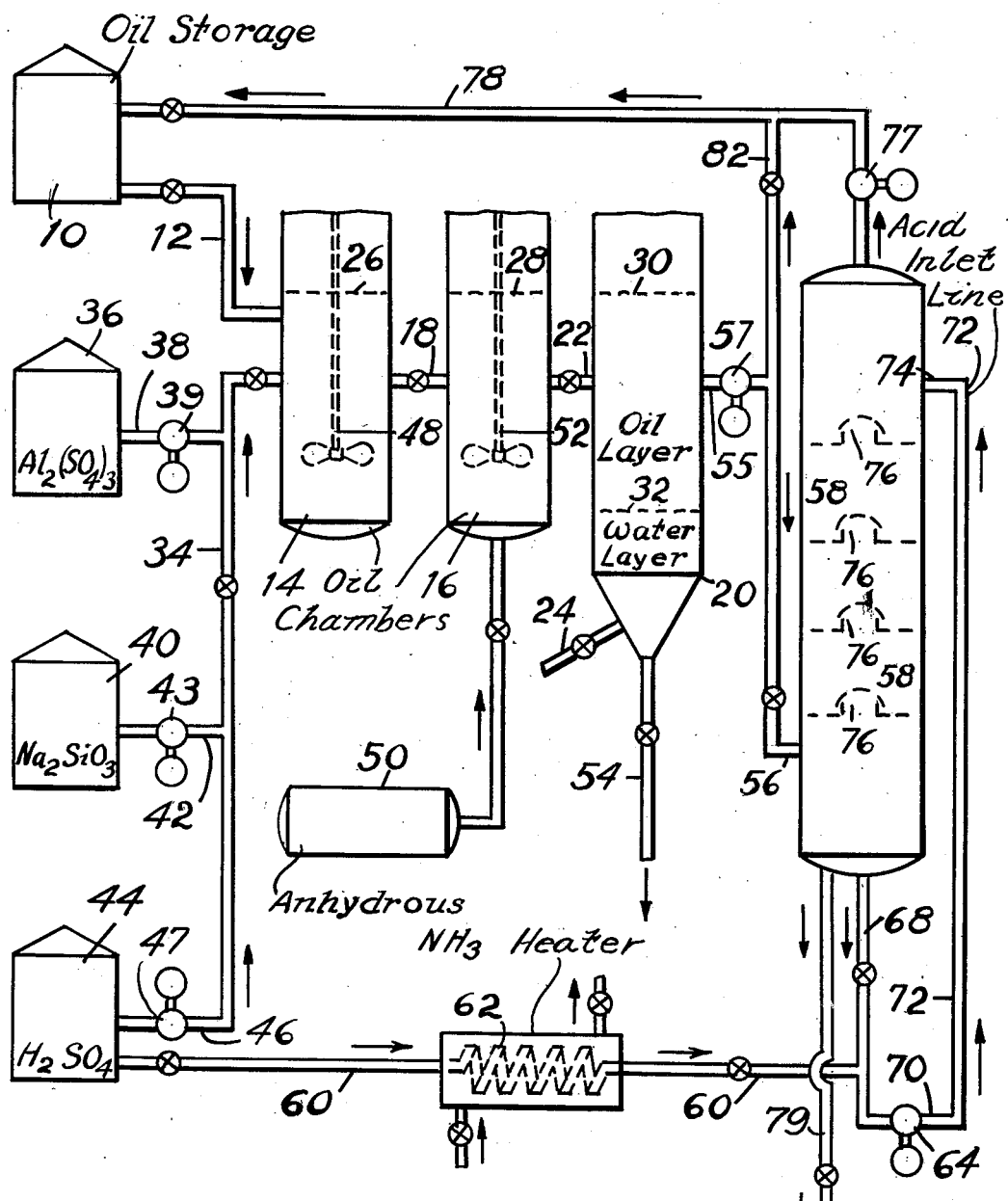

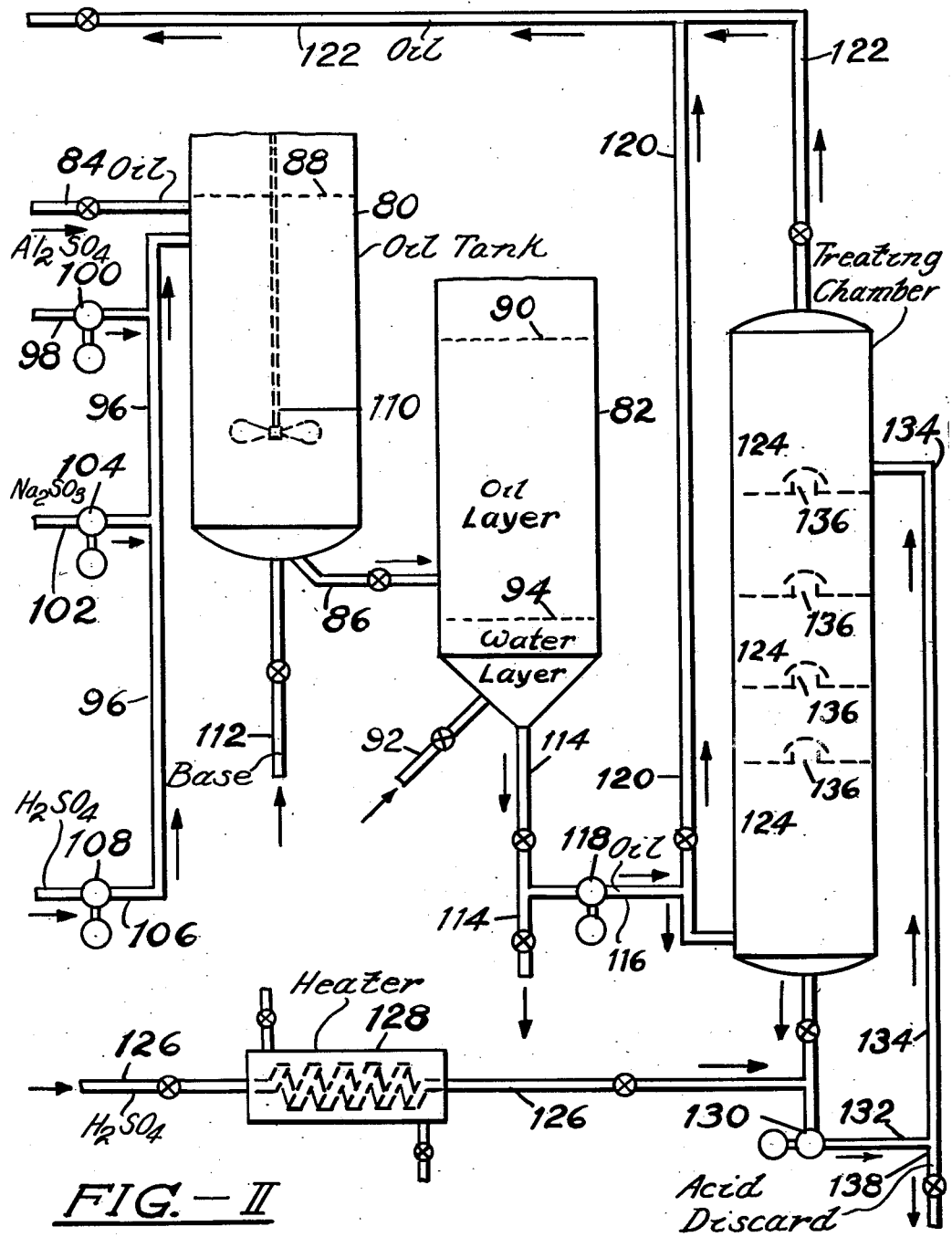

Patented Nov. 7, 1950

2,529,310

UNITED STATES PATENT OFFICE 2,529,310

ACID-TREATING A CONTAMINATED WATER-IMMISCIBLE BEAD-FORMING OIL

Roger W. Richardson and Charles N. Kimberlin, Jr., Baton Rouge, La., assignors to Standard Oil Development Company, a corporation of Delaware Application October 30, 1948, Serial No. 57,542

6 Claims. (Cl. 252—448)

This invention relates to a process for the preparation of inorganic gels in spherical form and, more particularly, relates to the regeneration or decontamination of the water-immiscible liquid used in the manufacture of such spheres.

It has previously been proposed to prepare inorganic gels in spherical form by dispersing the corresponding hydrosol in a water-immiscible liquid and retaining the dispersed droplets of hydrosol in the water-immiscible liquid until the sol has set into a firm hydrogel. Following this the spherical hydrogel particles are separated from the water-immiscible liquid and subjected to further processing treatment.

According to one mode of operation, the hydrosol is dispersed in relatively large droplets into one end of a column containing a water-immiscible liquid and the sol is caused to set during its passage through the column. This method produces relatively coarse spherical particles such as particles ranging from the size of beads down to grain size.

According to another mode of operation, the hydrosol is emulsified in a water-immiscible liquid preferably in the presence of a small amount of emulsifying agent and the emulsion is maintained by vigorous agitation until the hydrosol has set into the hydrogel. This method produces spheres of much smaller size. The size of the particles in such operation can be controlled by regulating the amount and degree of agitation given to the emulsion.

While the present invention in some of its broader aspects has a general application to both methods described above, it finds particular application to the latter method in which extremely finely divided spherical particles are formed by emulsifying the hydrosol in the water-immiscible liquid.

It has been noted that by continual operation procedures or by continued usage in batch processes, the water-immiscible liquid in which gelation occurs, becomes contaminated so as to reduce the efficiency of the operation. Contamination which results from this long continued usage is believed to be due to accumulation of finely divided solid particles of silica and/or alumina hydrogel suspended in the water-immiscible liquid. This contamination results in the following:

1. The shape of the hydrogel microspheres becomes non-spherical, thereby losing one of the main advantages of the process;
2. Control of particle size becomes difficult;
3. The hydrogel particles tend to become agglomerated into large masses;
4. The transfer of the hydrogel microspheres from the water-immiscible liquid into the water layer through the water-immiscible liquid-water interface becomes difficult;
5. The hydrogel particles tend to carry a film of the water-immiscible liquid with them through the water-immiscible liquid-water interface, thereby rendering difficult the further treatment of the particles; and
6. A considerable amount of a stable emulsion collects at the water-immiscible liquid-water interface.

It has been proposed in U. S. Patent No. 2,442,387 to treat the water-immiscible liquid used in the process by withdrawing it into a settling tank, heating the water-immiscible liquid to a desired temperature and allowing the contaminants to settle from the water-immiscible liquid or, by filtering the contaminants from the water-immiscible liquid by passing the water-immiscible liquid through a suitable bed of adsorbent material.

In the method proposed in the present invention, the decontamination is brought about with the aid of a cheap chemical reagent which separates completely from the water-immiscible liquid by gravity, decontaminating and regenerating the water-immiscible liquid with a minimum of process time lost and continued usage of the water-immiscible liquid for longer periods of time than is now possible. This decontaminating or regenerating procedure is carried out by treating the water-immiscible liquid with an acid as hereinafter described. Catalysts formed by the process include gels of alumina, silica, alumina-silica, alumina-chromia, silica-magnesia, silica-magnesia-alumina, silica-zirconia, silica-titania, etc.

The water-immiscible liquid used in a process for the formation of microspheres of a hydrogel may be a hydrocarbon oil such as naphtha, kerosene, gas oil, or light lubricating oil, or it may be any of the organic water-immiscible liquids such as carbon tetrachloride, nitrobenzene, chlorobenzene, etc. The acid used for the regeneration of water-immiscible liquid may be any of the inorganic acids such as sulphuric acid, hydrochloric acid, or phosphoric acid. Sulphuric acid is preferred.

In the drawings, Fig. I represents one form of apparatus capable of carrying out this invention in a continuous process and Fig. II represents another form of apparatus capable of carrying out this invention in a batch method.

Referring to the drawing, water-immiscible liquid such as hydrocarbon oil from storage tank 10 is introduced through valved line 12 into chamber 14. From here, the oil flows into chamber 16 through valved line 18 and then into chamber 20 through valved line 22. Water is introduced into the bottom of chamber 20 through valved line 24. Sufficient quantities of oil and water are added to the system so that the oil levels in chambers 14, 16, and 20 are maintained as shown at 26, 28 and 30, and the oil-water interface in chamber 20 is as shown at 32.

For purposes of illustration, the process will be described wherein a silica hydrosol impregnated with an aluminum salt is employed; however, other hydrosols might be used equally readily.

The hydrosol is prepared in pipe 34, by pumping into it the desired amounts of an aluminum salt, such as aluminum sulfate, from storage tank 36 through line 38, by means of pump 39, sodium silicate from storage tank 40 through line 42 by means of pump 43, and an acid, such as sulphuric acid, from storage tank 44 through line 46 by means of pump 47, sufficient mixing of the constituents for the hydrosol formation taking place within this line. From valved line 34, the inorganic hydrosol, such as silica-alumina hydrosol, is introduced into chamber 14 beneath the oil level as shown at 26 where the resultant oil-hydrosol mixture is agitated by mixer 48.

This agitation causes the emulsification of the hydrosol-oil mixture, the size of the droplets of hydrosol that are formed depending on the degree of agitation. These hydrosol droplets may be formed in sizes ranging from 10 to 500 microns in diameter, preferably from 20 to 120 microns. The droplets set into a hydrogel in this form.

From chamber 14, the oil-hydrogel suspension is passed through valved line 18 into chamber 16. A base such as anhydrous ammonia gas from storage tank 50 is added to the emulsion in chamber 16. This base is added to the mixture to remove excess acidity and to precipitate alumina within the gel structure and the amount added varies depending upon the amount of acid used and the pH desired in chamber 16. This pH will be about 4.0 to 5.0 for the example cited. The mixture is agitated by mixer 52 for the desired amount of time.

The suspension of hydrogel particles in the oil is then fed into the oil layer in tank 20 through valved line 22 where the hydrogel particles sink through the oil layer and pass through the oil-water interface, shown at 32, into the water layer in the bottom of chamber 20. The water layer containing the gel particles is then removed through valved line 54 at the bottom of chamber 20 and treated for the reclamation of the hydrogel particles. The process is continuous; all solutions being added to the system in the proper ratio according to the desired speed of formation of the gel particles.

Contamination of the water-immiscible liquid occurs after the process has continued for a time varying from 1 to 10 days, depending on the rate of oil recycle, i. e., the number of times it goes through the process per day. This contamination of the water-immiscible liquid results in the hydrogel particles becoming non-spherical, difficulty in controlling particle size, agglomeration of the particles into large masses, difficulty in transferring the hydrogel particles from the water-immiscible liquid into the water layer, and collection of a stable emulsion at the water-immiscible liquid-water interface. To remove the contaminants from the water-immiscible liquid, said contaminants believed to be small particles of silica and/or alumina, the water-immiscible liquid is treated as described below.

From chamber 20 in which the gel particles settle from the suspending oil and pass into the water layer, a continuous stream of the oil is removed through line 55 by means of pump 57 at a point between the level of the oil as shown at 30 and the entrance of the suspension of the oil-gel particles from chamber 16 through valved line 22. This continuous stream is divided at line 55, one stream being directed through lines 82 and 78 and returned to storage tank 10. The other stream is directed into the bottom of treatment chamber 58 through valved line 56. It is within this chamber that the oil is decontaminated by the action of sulphuric acid which treatment forms the subject of this invention.

From storage tank 44 sulphuric acid of a strength within a range of about 6° to 60° Bé., preferably 20° to 25° Bé., is passed by valved line 60 through heater 62 where it is raised to a temperature within a range of 60° to 220° F., preferably 140° to 190° F. The acid is then pumped by means of pump 64 into the top of treatment chamber 58 through valved lines 68, 70 and 72, and it is there introduced into the treatment chamber at a point shown as 74.

The acid that is introduced at the top of the treatment chamber 58 is heavier than the oil which is introduced into the bottom of the chamber, and due to their different densities, the oil and acid tend to change positions, the acid settling downward and the oil rising upward through the treatment chamber. The counterflow is prevented from channeling and the optimum contact is maintained between the oil and acid by means of baffle plates in the treatment chamber as shown at 76.

The lighter oil, having been decontaminated and regenerated by contact with the acid, is removed from the top of treatment chamber 58 by means of pump 77 and passed through valved line 78, into a storage tank 10. The heavier acid is drawn off from the bottom of the treatment chamber through valved line 68 where it is recirculated by means of pump 64 through valved lines 70 and 72 at the top of the treatment chamber. The optimum conditions of strength and temperature of the circulating acid are maintained by adding fresh acid from storage tank 44 through heater 62 and valved line 60 and by withdrawing the excess spent acid through valved line 79.

The treating process is most efficient when the ratio of acid to oil in the treating chamber is within a range of about one part acid to two parts oil by volume, to one part acid to twenty parts oil by volume, preferably at a ratio of one part acid to five parts oil by volume, the ratio being controlled by the flowage of oil through line 55 and pump 57 and of acid through valved line 72 and pump 64 into the treating chamber.

If it is desired to do so, the oil used in the process may be treated at one time in the treatment chamber by a batch process.

Referring now to Fig. II, oil is added to tanks 80 and 82 through valved lines 84 and 86 until the oil level is as shown at 88 and 90. Water is added to tank 82 through valved line 92 until the oil-water interface in tank 82 is as shown at 94.

A hydrosol is then formed in valved line 96 by pumping the proper amounts of an aluminum salt, such as aluminum sulphate, through line 98 by means of pump 100, sodium silicate solution through line 102 by means of pump 104 and a solution of an inorganic acid, such as sulphuric acid, through line 106 by means of pump 108. This hydrosol is then added to the oil in tank 80 through valved line 96. The mixture of oil and hydrosol is then agitated by mixer 110 for a length of time sufficient for the hydrosol droplets to set to microspheres of hydrogel. A base, such as anhydrous ammonia, is then added to the mixture in tank 80 through valved line 112. The amount of the base added is dependent upon the amount of acid and aluminum salt used and the pH desired in tank 11. This pH will be about 4.0 to 5.0 for the example given. After addition of ammonia is complete, the suspension of the hydrogel particles formed in tank 80 is passed by valved line 86 into separating tank 82 where the hydrogel particles are allowed to settle through the oil layer and pass into the water layer through the oil-water interface shown at 94. The water containing the hydrogel particles is then removed from separation tank 82, through valved line 114, where the particles pass through the process of reclamation.

The oil in tank 82 may be returned to storage or reuse in the process through lines 114, 116, pump 118 and lines 120 and 122. After a lapse of sufficient period of reuse, the oil becomes contaminated. To remove the contaminants from the oil, said contaminants believed to be small particles of silica and/or alumina, the oil is treated as described below.

Through line 116 by means of pump 118 the oil used in the process is passed into valved line 120 and treating chamber 124. Sulphuric acid of a strength within a range of 6° to 60° Bé., preferably 20° to 25° Bé. is passed via line 126 through heater 128 where it is raised to a temperature within a range of about 60° to 220° F., preferably 140° to 190° F. The acid is then pumped by means of pump 130 into the top of treatment chamber 124 through valved lines 132 and 134. The acid that is introduced at the top of the treatment chamber 124 is heavier than the oil contained in said chamber and, due to their different densities, oil and acid tend to change positions, the acid settling downward and the oil rising upward through the mixture. The counterflow is prevented from channeling and the optimum contact is maintained between the oil and acid by means of baffle plates in the treatment chamber as shown at 136. After oil and acid become completely separated, the oil, regenerated and decontaminated by contact with the acid, is removed from the top of the treatment chamber 124 through valved line 122 and returned to storage, or if it is desired, the acid may be repumped by pump 130 to the top of treatment chamber 124 through valved lines 132 and 134 for further treatment of the oil. Once the contacting process is completed the acid may be removed from treating chamber 124 through valved line 132 and discarded through valved line 138. The exact mechanism by which this decontamination or regeneration occurs is unknown but it is believed that the acid causes the removal of the particles of solid material by solvent action and/or selective wetting.

The following is an example of the process used as described above:

*Example*

A hydrosol was prepared by adding 40 gallons of 25° Bé. sodium silicate ($Na_2O_3.25SiO_2$) solution to 20 gallons of 23° Bé. sulphuric acid. This hydrosol was impregnated with aluminum salt by adding 20 gallons of 34° Bé. aluminum sulphate solution. The impregnated hydrosol was injected into 425 gallons of an SAE 10 lubricating oil [1] which had been preheated to 200° F., where it was emulsified by stirring with a propeller type stirrer. After stirring for 15 minutes, the hydrosol droplets had set to microspheres of hydrogel. Anhydrous ammonia gas was then introduced till the pH of the emulsified hydrogel microspheres was raised to 4.0-4.5. The mixture was then transferred to a vessel containing water and allowed to become quiescent. The hydrogel spheres settled into the water layer, said water layer was then removed, the hydrogel recovered by filtration, washed with water to remove soluble salts, dried, and used as a catalyst for cracking petroleum oils. After repeated use for about 10 days, the oil had become so contaminated as to seriously impair formation of the desired spheres of hydrogel.

425 gallons of the contaminated oil was agitated by stirring with 100 gallons of 23° Bé. sulphuric acid at 185° F. for 30 minutes. The acid was then allowed to settle and was withdrawn. The oil was returned to service in making hydrogel spheres and was in every way equivalent to the original fresh oil for this purpose.

What is claimed is:

1. In a process for forming spherical inorganic gels wherein droplets of a hydrosol are set to a gel in a water-immiscible liquid in a contact zone and the water-immiscible liquid becomes contaminated after continuous use, the improvement which comprises withdrawing at least a portion of said water-immiscible liquid from said contact zone, mixing an inorganic acid with the withdrawn water-immiscible liquid in a mixing zone to remove contaminants therefrom and removing said regenerated water-immiscible liquid from said mixing zone and returning said regenerated water-immiscible liquid to said process.

2. In a process for forming silica alumina gel wherein droplets of silica alumina hydrosol are set to a gel in a hydrocarbon oil and the hydrocarbon oil becomes contaminated after continuous use, the improvement which comprises continually withdrawing hydrocarbon oil from the process, mixing inorganic acid with the withdrawn hydrocarbon oil to remove contaminants therefrom, and recovering regenerated hydrocarbon oil.

3. In a process for forming silica alumina gel wherein droplets of silica alumina hydrosol are set to a gel in a gas oil, and the gas oil becomes contaminated after continuous use, the improvement which comprises withdrawing at least a portion of said gas oil from the process, mixing a sufficient amount of sulphuric acid of a strength between 6° to 60° Bé. with the withdrawn gas oil and maintaining the temperature of the mixture between about 60° and 200° F. to remove substantially all of the contaminants therefrom and separating the regenerated gas oil from the sulphuric acid.

4. A process according to claim 3 in which the sulphuric acid used is of a strength of from 20° to 25° Baumé at a temperature of from 140° F.

---

[1] Saybolt Viscosity at 100° F.=120.
Saybolt Viscosity at 210° F.=40.

to 190° F. and in the amount of 1 part acid to 5 parts of oil by volume.

5. In a process for making finely divided spherical particles of inorganic gel wherein the corresponding hydrosol is emulsified in a hydrocarbon oil and wherein the emulsion is maintained until the hydrosol has set to firm hydrogel particles and wherein the oil becomes contaminated with finely dispersed hydrogel particles; the improvement which comprise treating said oil with a sulphuric acid to remove the contaminants therefrom, thereafter separating the oil from the acid and re-using it in the process.

6. In a continuous process for forming spherical inorganic gels wherein droplets of hydrosol are set to gel particles in a water immiscible liquid in a contact zone and said liquid is withdrawn from and recycled to said contact zone and becomes contaminated after prolonged use, the steps which comprise recycling some of said withdrawn liquid to said contact zone, passing the rest of said liquid into a mixing zone, introducing sulfuric acid into said mixing zone to remove contaminants from said liquid, returning said regenerated liquid to said contact zone and withdrawing spent acid from said mixing zone.

ROGER W. RICHARDSON.
CHARLES N. KIMBERLIN, Jr.

REFERENCES CITED

The following references are of record in the file of this patent:

UNITED STATES PATENTS

| Number | Name | Date |
|---|---|---|
| 2,139,629 | Alton | Dec. 6, 1938 |
| 2,305,742 | Simpson et al. | Dec. 22, 1942 |
| 2,312,112 | McNealy | Feb. 23, 1943 |
| 2,429,751 | Gohr et al. | Oct. 28, 1947 |
| 2,442,387 | Valas | June 1, 1948 |